United States Patent
Oster

(10) Patent No.: US 10,092,932 B2
(45) Date of Patent: Oct. 9, 2018

(54) MULTILAYERED DISPOSABLE CLEANING PAD

(71) Applicant: Alan Oster, Bismarck, ND (US)

(72) Inventor: Alan Oster, Bismarck, ND (US)

(*) Notice: Subject to any disclaimer, the term of this patent is extended or adjusted under 35 U.S.C. 154(b) by 81 days.

(21) Appl. No.: 15/144,720

(22) Filed: May 2, 2016

(65) Prior Publication Data

US 2016/0316986 A1  Nov. 3, 2016

Related U.S. Application Data

(60) Provisional application No. 62/155,109, filed on Apr. 30, 2015.

(51) Int. Cl.
| | |
|---|---|
| *A47L 13/12* | (2006.01) |
| *A47L 13/18* | (2006.01) |
| *A47L 13/19* | (2006.01) |
| *B08B 1/00* | (2006.01) |
| *B32B 5/00* | (2006.01) |

(52) U.S. Cl.
CPC .............. *B08B 1/006* (2013.01); *A47L 13/12* (2013.01); *A47L 13/18* (2013.01); *A47L 13/19* (2013.01); *B08B 1/00* (2013.01); *B32B 5/00* (2013.01)

(58) Field of Classification Search
CPC .................................. A47L 13/18; A47L 13/19
See application file for complete search history.

(56) References Cited

U.S. PATENT DOCUMENTS

| | | | |
|---|---|---|---|
| 1,231,168 A | 6/1917 | Jones |
| 1,551,416 A | 8/1925 | Marshall |
| 1,782,502 A | 11/1930 | Crane |
| 1,941,320 A | 12/1933 | Pamplin |
| 1,999,753 A | 4/1935 | Diemer |
| 2,179,614 A | 11/1939 | Cohen |
| 2,210,754 A | 8/1940 | Frank |
| 2,233,686 A | 3/1941 | Topjian |
| 2,621,784 A | 12/1952 | Van Boytham |
| 2,762,158 A | 9/1956 | Duffey |
| 2,782,912 A | 2/1957 | Humphrey |
| 2,790,982 A | 5/1957 | Schneider |
| 2,999,265 A | 9/1961 | Duane et al. |
| 3,183,543 A | 5/1965 | Worcester |
| 3,240,326 A | 3/1966 | Miller |
| 3,414,927 A | 12/1968 | Worcester |
| 3,485,349 A | 12/1969 | Chaney, Jr. |
| 3,608,708 A | 9/1971 | Storandt |
| 3,619,280 A | 11/1971 | Scheuer |
| 3,777,328 A | 12/1973 | Kaplan |
| 3,806,260 A | 4/1974 | Miller |
| 3,870,150 A | 3/1975 | Hummel |
| 4,071,921 A | 2/1978 | Jury |

(Continued)

*Primary Examiner* — Randall Chin
(74) *Attorney, Agent, or Firm* — John A. Arsenault; Daniel Dubuisson

(57) ABSTRACT

A disposable pad for treating or cleaning various types of surfaces is presented. The disposable pad has one or more flaps that are operatively affixed to the first surface on the first sheet of the pad and is rotatably movable between a first configuration and a number of second configurations to expose one of many surface pairs having a cleaning material unique to the desired application. A second sheet is operatively affixed to the second surface of the first sheet on at least two edges to form a mitt-like cavity and provides for ambidextrous wielding of the disposable pad.

17 Claims, 3 Drawing Sheets

(56) References Cited

U.S. PATENT DOCUMENTS

| | | |
|---|---|---|
| 4,131,195 A | 12/1978 | Worrell, Sr. |
| 4,220,244 A | 9/1980 | Elmore |
| 4,347,931 A | 9/1982 | Ginger et al. |
| 4,427,111 A | 1/1984 | Laipply |
| 4,575,891 A | 3/1986 | Valente |
| 4,601,081 A | 7/1986 | Sutton et al. |
| 4,645,251 A | 2/1987 | Jacobs |
| 4,696,065 A | 9/1987 | Elenteny |
| 4,902,283 A | 2/1990 | Rojko et al. |
| 4,959,881 A | 10/1990 | Murray |
| 5,473,789 A | 12/1995 | Oster |
| 5,649,336 A | 7/1997 | Finch et al. |
| 5,806,668 A | 9/1998 | Bixby |
| 5,864,883 A | 2/1999 | Reo |
| 5,924,160 A | 7/1999 | Bradley |
| 6,305,044 B1 | 10/2001 | James et al. |
| 7,681,250 B2 | 3/2010 | Friedstrom |
| 7,823,244 B2 | 11/2010 | Knopow et al. |
| 8,230,523 B2 | 7/2012 | Chareyron |
| 8,263,183 B2 | 9/2012 | Michaels et al. |
| 2006/0143847 A1* | 7/2006 | Vinson .................... A47L 13/16 15/227 |
| 2010/0064463 A1 | 3/2010 | Beatty |
| 2010/0083453 A1* | 4/2010 | Abbas ...................... A47K 7/03 15/210.1 |
| 2012/0210532 A1 | 8/2012 | Slade, Jr. |

* cited by examiner

MULTILAYERED DISPOSABLE CLEANING PAD

CROSS-REFERENCE TO RELATED APPLICATIONS

This application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

U.S. Provisional Patent Application App. No. U.S. 62/155,109 titled "Multilayered Disposable Cleaning Pad," filed on Apr. 30, 2015, the subject matter of which is incorporated by reference herein in its entirety.

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

STATEMENT REGARDING FEDERALLY SPONSORED RESEARCH AND DEVELOPMENT

Not Applicable.

BACKGROUND OF DISCLOSURE

1. Field of Invention

The present invention relates to a disposable cleaning implement and more specifically to a multilayered mitt-like disposable pad incorporating means for cleaning and drying numerous types of surfaces or spills.

2. Description of Prior Art

It often becomes necessary for surfaces to be manually cleaned in order to remove dirt, residues, spills, or unsanitary conditions in public facilities such as restaurants, schools, service stations, airports, bus terminals, and many other private facilities. Numerous types of disposable cleaning pads are known. For example, Elenteny (U.S. Pat. No. 4,696,065) discloses a flexible multilayered glove and method for making the same. The patent to Elenteny discloses a glove with an impervious flexible inner layer and outer layer, a release means between the inner and outer layer that enables each outermost layer to be removable after use, and each successive layer adjacent to each inner layer has a longer wrist portion than the next outermost layer. The glove disclosed in the patent to Elenteny not only requires additional material upon use and removal of each subsequent layer of the glove, the layers are nested and each layer provides the same functionality as each subsequent layer, thus the glove cannot be used for multiple purposes that require the use of different cleaning solutions within the same glove. Additionally, the patent to Elenteny does not disclose a cleaning pad that may be stacked efficiently to enhance storage and transportation of bulk quantities.

Chareyon (U.S. Pat. No. 8,230,523) discloses an ambidextrous mitt for treating surfaces wherein a removable layer fastens to the outer surface of one of the two outer walls of the mitt, thus allowing for thermal and mechanical protection of the user's hand. The first wall of the mitt has fabric layers that give the wall a semi-flexible wafer shape, and the second wall is connected to the first by seams and is comprised of an elastic textile honeycomb fabric that forms separate pockets. The patent to Chareyon discloses a glove wherein each subsequent removal of layers requires a disposal step for each removed layer and does not provide a glove that addresses the need for applying various types of cleaning solutions to a surface in a specific order including all the required cleaning elements without having to purchase cleaners and other pads all within the same glove.

Beatty et al (U.S. Patent Application 2010/0064463) discloses a wipe assembly wherein a plurality of wipes are stacked, each having two opposing surfaces and being rotatable from a first position to a second position. The application to Beatty does not disclose a glove or mitt wherein cleaning solutions of various types may be contained and kept separated within the same glove article.

The prior art herein lacks a drying pad or specific surface for collecting dust, there is no means to remove a used wipe or separable cleaning pad, and it lacks the ability to follow a specific order of cleaning, including a wiping, cleaning, and drying order, consistent with most surface cleaning processes. Accordingly, a need exists for a singular disposable pad apparatus that is capable of cleaning and drying a variety of surfaces, easy to manufacture, requires the purchase of less resources, maintains a single unit assembly, and is efficiently storable in large quantities. The present invention addresses these needs as well as other problems associated with disposable pads for cleaning surfaces. The present invention also offers further advantages over the prior art and solves other problems associated therewith.

SUMMARY OF THE DISCLOSURE

The present invention provides a disposable pad and method for using the same for cleaning a multitude of surface types and having a book spine-like arrangement of multiple flaps with varying functionality within each flap.

In a preferred embodiment, the disposable pad comprises a first surface, a second surface, and a pad perimeter, wherein the first sheet is substantially planar and comprises one or more flaps fastened to the first surface at a flap attachment line and rotatably movable about the flap attachment line between a first configuration and one or more second configurations, wherein a surface pair is exposed in each first or second configuration and each surface pair comprises a cleaning material for a selective application. A second sheet is operatively affixed to the first sheet on at least two edges of the pad perimeter to accommodate the hand of a user. The disposable pads are preferably manufactured from biodegradable materials capable of being flushed down a toilet, such as paper, gauge, cotton, or other biodegradable materials. In the first configuration, the disposable pad may be stored and dispensed in the form of a stacked or rolled collective and may also be used to dry or polish a target surface. In an embodiment, the disposable pad further comprises two rounded extensions to accommodate the hand of a user, whether the user be left-handed or right-handed, and to enhance the cleaning or treating of curved surfaces.

In embodiments, at least one flap or the mitt-like cavity further comprises one or more impervious layers that maintains separation between the other layers. In an embodiment, one or more flaps of the disposable pad comprise different identifier tabs that inform the user of the contents within each layer. In an embodiment, one or more flaps further comprise an edge flap for maintaining position of the flaps, wherein the edge flap is positioned on one or more flaps distal to the flap attachment line.

In an embodiment, one or more flaps of the disposable pad comprise stitching throughout the flap designed to increase absorbency of liquids, and/or electrostatic charges to increase attraction of dust and other solids to the flap. In an embodiment, one or more flaps of the disposable pad contain a liquid such a cleaner, wax, disinfectant, rinse agent, drying agent, or combinations thereof.

In an embodiment, the disposable pad comprises a first sheet having a first surface, a second surface, and a pad perimeter, wherein the first sheet is substantially planar. A second sheet is operatively affixed to the second surface on at least two edges of the pad perimeter defining sheet attachment lines to form a mitt-like cavity for receiving a hand. A third sheet is fastened to the first surface on a flap attachment line and at least two edges of the pad perimeter to form a cover layer. A fourth sheet is fastened to the first surface on the flap attachment line to form two or more flaps.

In an embodiment, the cleaning assembly is designed for portable toilet wipes, including both a wet wipe pad and a drying pad.

In an embodiment, one or more flaps of the disposable pad comprise one or more perforations along the axis of the book spine-like arrangement that allows for quick removal of one or more flaps. In an embodiment, the perforations are oriented parallel to the pad perimeter or the flap attachment line.

A large number of variations are possible through minor changes in the manufacturing process without deviating from the scope of the invention.

Embodiments include one, more, or any combination of all of the features listed above.

Other features and advantages of the present invention will become apparent from the following more detailed description, taken in conjunction with the accompanying, which illustrate, by way of example, the principles of the invention.

DESCRIPTION OF THE DRAWINGS

FIG. 4a and FIG. 4b are perspective views of a disposable pad, wherein FIG. 4a shows the flap assembly closed in a first configuration, and FIG. 4b shows the flap assembly open in a second configuration;

FIG. 7a and FIG. 7b are perspective views of a disposable pad, wherein the disposable pad is used to clean and dry a target surface that is curved, wherein FIG. 7a shows the flap assembly in a second configuration, and FIG. 7b shows the flap assembly in the first configuration, in accordance with an exemplary embodiment of the present invention;

Figure 1:
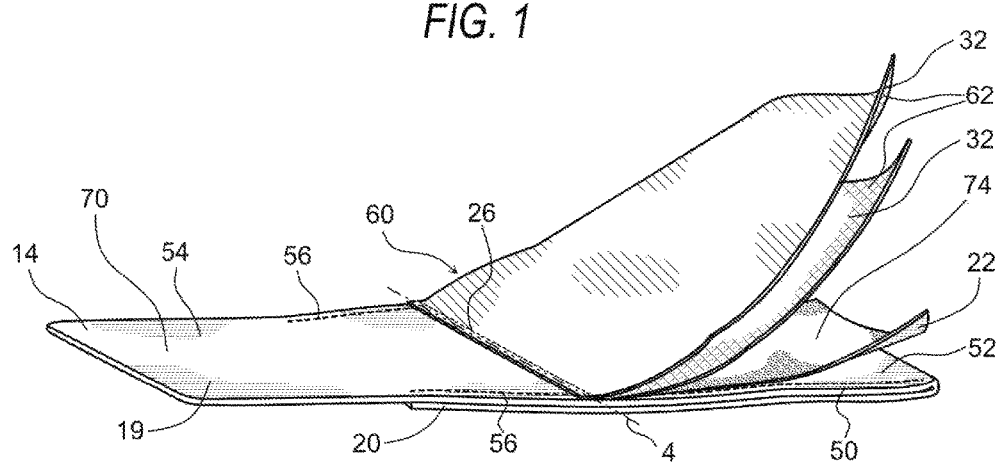
FIG. 1 is a top perspective view of a multilayered disposable pad equipped with a flap assembly, in accordance with an exemplary embodiment of the present invention.

REFERENCE NUMERALS IN THE DRAWINGS transverse centerline 4
target surface 10
dispenser 12
disposable pad 14
hand 16
identifier tab 18
first sheet 19
second sheet 20
flap 22
flap attachment line 26
third sheet 28
fourth sheet 29
impervious layer 32
pad perimeter 50
upper portion 52
lower portion 54
sheet attachment line 56
perforations 58
flap assembly 60
surface pair 62
edge flap 64
rounded extensions 68
first surface 70
second surface 72
cleaning material 74
wrapper 110
mitt-like cavity 130

DETAILED DESCRIPTION OF THE DISCLOSED EMBODIMENT

Illustrative embodiments of the invention are described below in the accompanying Figures. The following detailed description provides detailed schematics for a thorough understanding of and an enabling description for these embodiments. One having ordinary skill in the art will understand that the invention may be practiced without certain details. In other instances, well-known structures and functions have not been shown or described in detail to avoid unnecessarily obscuring the description of the embodiments.

FIG. 1 is a top perspective view of a multilayered disposable pad 14 equipped with a flap assembly 60, in accordance with an exemplary embodiment of the present invention. The disposable pad 14 comprises a first sheet 19 and a second sheet 20, wherein the flap assembly 60 is fastened, either operatively affixed or detachable via perforations, to the first surface 70 of the first sheet 19 at an flap attachment line 26, wherein the flap attachment line 26 is generally positioned proximate to the transverse centerline 4 and extends towards the pad perimeter 50; however, it is understood that several embodiments may incorporate an flap attachment line 26 oriented parallel to the transverse centerline 4 and positioned at either the upper portion 52 or the lower portion 54. The flap assembly 60 comprises one or more flaps 22 rotatably movable about the flap attachment line 26 to and from the upper portion 52 and the lower portion 54 to expose a surface pair 62, wherein each surface pair 62 comprises one or more cleaning materials 74. Cleaning materials 74 may include, but are not limited to, absorbent materials, waxes, sanitizing or other medical materials, corrosive materials, oxidizing materials, solvents, and materials that attract dust and dirt from static electricity accumulated from application of the disposable pad 14 with a target surface 10.

In embodiments wherein one or more cleaning materials 74 comprises a liquid, one or more surface pairs 62 may be separated from one another by an impervious layer 32. Impervious layers 32 may take a variety of forms, which may include, but are not limited to, a porous impervious layer, a hydrophobic impervious layer, a hydrophilic impervious layer, drying layer or surface, or other impervious layer forms wherein the molecular structures of the impervious layer 32 comprises a plurality of moieties to address cleaning targets that require more selective cleaning materials 74.

Figure 2:
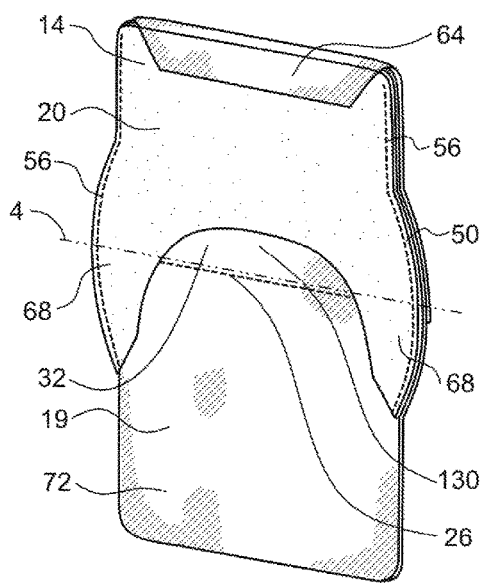
FIG. 2 is a side perspective view of a disposable pad, in accordance with an exemplary embodiment of the present invention.
Figure 3:
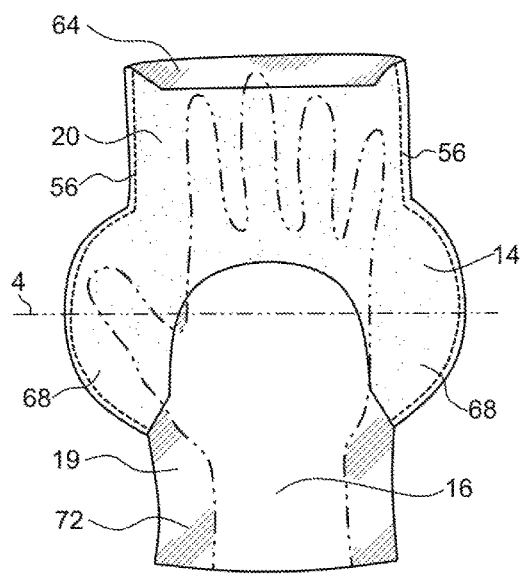
FIG. 3 is a bottom view of a disposable pad showing the mitt-like form of the second sheet, in accordance with an exemplary embodiment of the present invention.

FIG. 2 is a side perspective view of a disposable pad 14, in accordance with an exemplary embodiment of the present invention. FIG. 3 is a bottom view of a disposable pad showing the mitt-like form of the second sheet 20, in accordance with an exemplary embodiment of the present invention. The second sheet 20 is operatively affixed to the second surface 72 of the first sheet 19 on at least two edges of the pad perimeter 50 via at least two sheet attachment lines 56 to form a mitt-like cavity 130 for receiving a hand 16. The interior of the mitt-like cavity 130 may be coated with an impervious layer 32 for protecting a hand 16 from exposure to the cleaning materials 74 during cleaning or drying of a target surface 10. In the example embodiments of FIG. 1 and FIG. 2, the disposable pad 14 comprises two transverse and oppositely directed rounded extensions 68 which provides volume for a thumb of either a right-handed or a left-handed user for preventing the disposable pad 14 from sliding off of the hand during use. The rounded extensions 68 further provide better contact between surface pairs 62 and a target surface 10 having a curved form.

In preferred embodiments, the disposable pad 14 is manufactured from a lightweight, biodegradable material, which may include, but is not limited to paper, gauge, cotton and biodegradable polymers. The two or more sheet attachment lines 56 may operatively affix the first sheet 19 and second sheet 20 via an adhesive or by stitching using a biodegradable material.

In an embodiment, the flap 22 positioned furthest from the second sheet 20 may further comprise an edge flap 64 which folds over the uppermost or lowermost edges of the disposable pad 14 for maintaining the position of the flaps during use.

Figure 4A:
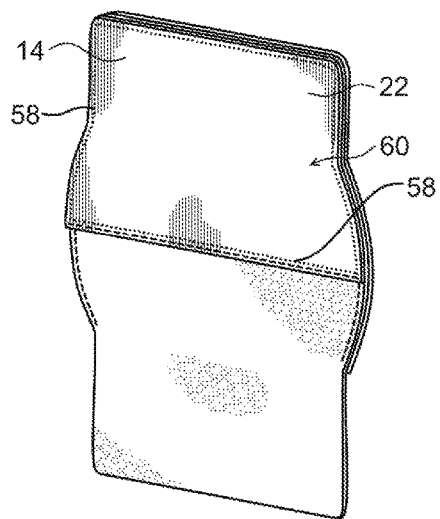
Figure 4B:
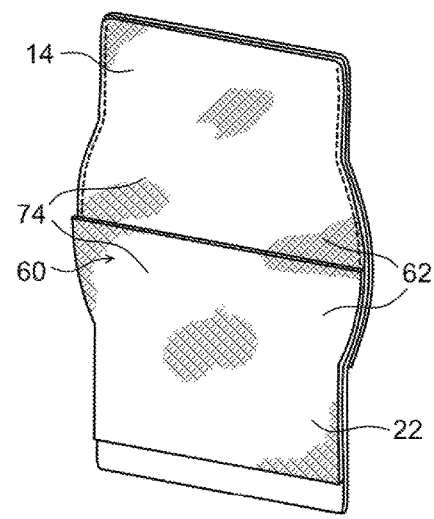
Figure 5:
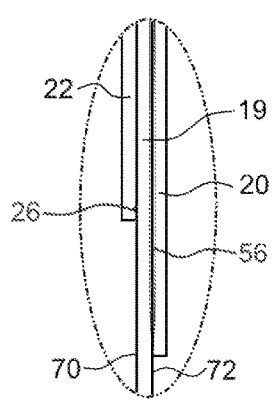
FIG. 5 is a close up side view of the disposable pad in FIG. 4a, in accordance with an exemplary embodiment of the present invention.

FIG. 4a and FIG. 4b are perspective views of a disposable pad, wherein FIG. 4a shows the flap assembly 60 closed in a first configuration, and FIG. 4b shows the flap assembly 60 open in a second configuration. FIG. 5 is a close up side view of the disposable pad in FIG. 4a, in accordance with an exemplary embodiment of the present invention. The disposable pads 14 are generally stored and may be stacked in large quantities while in the first configuration, thus easing storage in boxes for industrial use. Rotation of a flap 22 from the first configuration to a second configuration exposes a surface pair 62 comprising a cleaning material 74 selective to the desired application. Embodiments incorporating more than one flap 22 may assume more than one second configuration, wherein a unique surface pair 62 is exposed in each second configuration. In an embodiment, one or more flaps 22 are detachable from the disposable pad 14 via perforations 58, which may be oriented substantially parallel to and positioned proximate to the flap attachment line or may be oriented substantially parallel to and positioned proximate to the pad perimeter 50.

Figure 6:
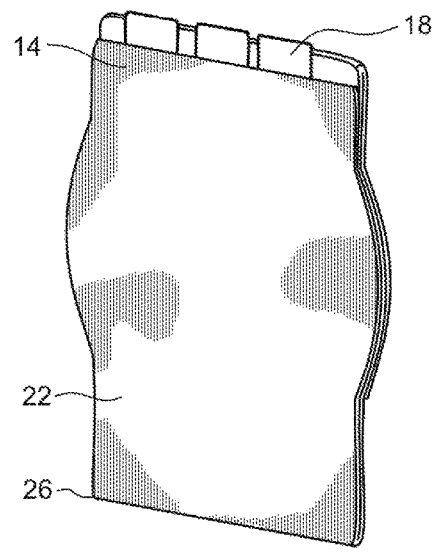
FIG. 6 is a perspective view of a disposable pad, wherein the disposable pad comprises one or more flaps wherein each flap comprises an identifier tab, in accordance with an exemplary embodiment of the present invention.

FIG. 6 is a perspective view of a disposable pad the present invention, wherein the disposable pad 14 comprises one or more flaps 22 wherein each flap 22 comprises an identifier tab 18, in accordance with an exemplary embodiment of the present invention. The identifier tab 18 informs the user of the type of cleaning material 74 that will be exposed by a surface pair 62 upon pulling the flap 22 having that particular identifier tab 18 to and from a first configuration and a second configuration. The identifier tab 18 may take a number of forms, which may include but is not limited to, text, color, or a graphic symbol.

Figure 7A:
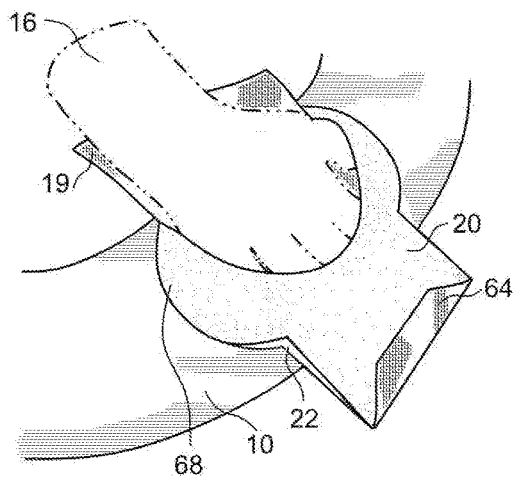
Figure 7B:
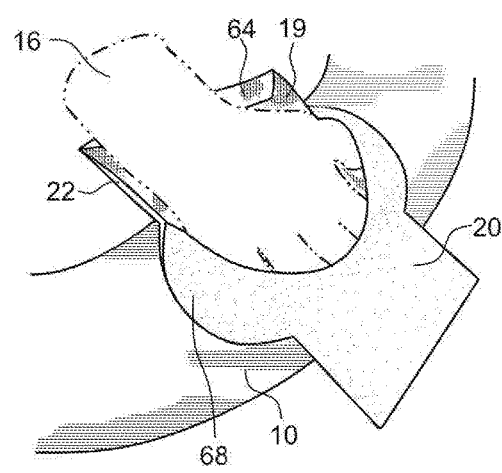

FIG. 7a and FIG. 7b are perspective views of a disposable pad, wherein the disposable pad 14 is used to clean and dry a target surface 10 that is curved, wherein FIG. 7a shows the flap assembly 60 in a second configuration, and FIG. 7b shows the flap assembly in the first configuration, in accordance with an exemplary embodiment of the present invention. During operation of the disposable pad 14 in an example embodiment, a user may initially peel a flap 22 from the upper portion 52 towards the lower portion 54 to expose a surface pair 62 and apply the corresponding cleaning material 74 to a target surface 10, then revert the flap assembly 60 to the first configuration to dry, sanitize, or further clean the target surface 10.

Many combinations of cleaning materials 74 may be provided separately within each disposable pad 14 and applied in steps as needed to treat or clean a variety of target surfaces 10. For example, a user may desire to polish a shoe, surfboard, or vehicle surface and may therefore desire to use a disposable pad 14 wherein the flap assembly comprises one or more interior surfaces comprising a wax material, and one or more interior surfaces comprising a dust cloth. In another example, a user may desire to clean up animal or infant waste and may therefore desire to use a disposable pad 14 comprising, separately, an absorbent material and a drying material.

Figure 8:
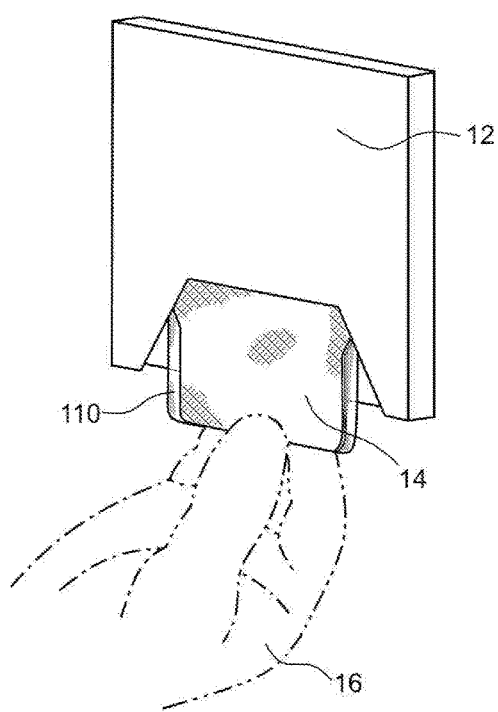
FIG. 8 is a perspective view of a disposable pad, wherein a plurality of disposable pads are dispensed from a dispenser, in accordance with an exemplary embodiment of the present invention.

FIG. 8 is a perspective view of a disposable pad 14, wherein a plurality of disposable pads 14 are dispensed from a dispenser 12, in accordance with an exemplary embodiment of the present invention. The dispenser 12 may be a sealed or air-tight unit from which disposable pads 14 may be dispensed, in a first stacked configuration as shown in the example in FIG. 8, or in a number of alternative stacked configurations, including a rolled stacked configuration wherein the disposable pads 14 may be readily separable by including perforations between disposable pads 14.

Storing the disposable pads 14 in a stacked configuration enhances bulk storage of the disposable pads 14 and eases loading of a dispenser 12 with disposable pads 14. Alternatively, the disposable pads 14 may stacked with upper portions 52 overlapping and lower portions 54 directed away from each other, thus allowing for a dispenser 12 to dispense different forms of disposable pads 14 within the same dispenser 12. The disposable pad 14 may be packaged in an air-tight disposable wrapper 110 manufactured from compounds that include, but are not limited to, cellophane, aluminum foil or another material of at least partially polymeric composition for increased portability and consolidation of required cleaning components.

Figure 9:
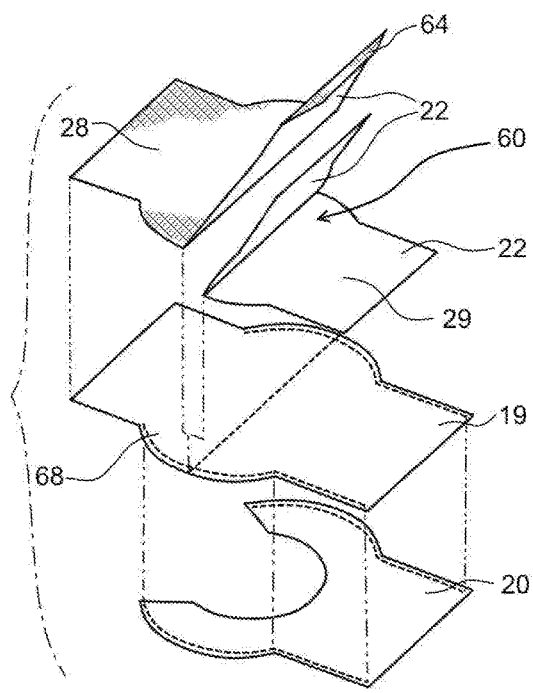
FIG. 9 is an exploded perspective view of a disposable pad, in accordance with an exemplary embodiment of the present invention.

FIG. 9 is an exploded perspective view of a disposable pad 14, in accordance with an exemplary embodiment of the present invention. The example in FIG. 9 shows an embodiment wherein a third sheet 28 is fastened to the first surface 70 along the flap attachment line 26 and at least two edges of the pad perimeter 50 proximate to the lower portion 54 to form a cover layer and wherein a fourth sheet 29 is fastened to the first surface 70 along the flap attachment line 26 proximate to the upper portion 52 and forming two or more additional flaps 22.

While particular embodiments of the invention have been described and disclosed in the present application, it is clear that any number of permutations, modifications, or embodiments may be made without departing from the spirit and the scope of this invention. Accordingly, it is not the inventor's intention to limit this invention in this application, except as by the claims.

Particular terminology used when describing certain features or aspects of the invention should not be taken to imply that the terminology is being redefined herein to be restricted to any specific characteristics, features, or aspects of the invention with which that terminology is associated. In general, the terms used in the claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise embodiment or form disclosed herein or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

In general, the terms used in the claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

In light of the above "Detailed Description," Inventor may make changes to the invention. While the detailed description outlines possible embodiments of the invention and discloses the best mode contemplated, no matter how detailed the above appears in text, the invention may be practiced in a myriad of ways. Thus, implementation details may vary considerably while still being encompassed by the spirit of the invention as disclosed by the inventor. As discussed herein, specific terminology used when describing certain features or aspects of the invention should not be taken to imply that the terminology is being redefined herein to be restricted to any specific characteristics, features, or aspects of the invention with which that terminology is associated.

What is claimed is:

1. A disposable pad for cleaning surfaces, said disposable pad comprising:
   a first sheet having a first surface, a second surface, and a pad perimeter, wherein said first sheet is substantially planar and comprises one or more flaps fastened to said first surface at a flap attachment line;
   a second sheet operatively affixed to said second surface on at least two edges of said pad perimeter defining sheet attachment lines to form a mitt-like cavity for receiving a hand;
   said one or more flaps being rotatably movable about said flap attachment line to and from a first configuration or one or more second configurations to expose a surface pair unique to said first configuration or each said second configuration, wherein each said surface pair comprises one or more cleaning materials; and
   said flap attachment line being oriented substantially parallel to a transverse centerline and extending substantially towards and directly contacting said pad perimeter.

2. The disposable pad according to claim 1, wherein said flap attachment line extends to and terminates substantially proximate to said pad perimeter.

3. The disposable pad according to claim 1, further comprising two transverse rounded extensions for providing volume for a thumb of either a right-handed or a left-handed user for preventing the disposable pad from sliding off of the hand during use.

4. The disposable pad according to claim 3, wherein said rounded extensions are oppositely directed.

5. The disposable pad according to claim 1, wherein each said cleaning material is selected from the group consisting of absorbent materials, waxes, sanitizing materials, other medical materials, corrosive materials, oxidizing materials, solvents, and materials that attract dust and dirt from static electricity.

6. The disposable pad according to claim 1, wherein one or more said flaps comprise one or more impervious layers for preventing passage of one or more said cleaning materials through one or more said surface pairs.

7. The disposable pad according to claim 6, wherein one or more said impervious layers assumes a form selected from the group consisting of a porous impervious layer, a hydrophobic impervious layer, a hydrophilic impervious layer, and other impervious layer forms incorporating molecular structures comprising a plurality of moieties for addressing complex cleaning targets.

8. The disposable pad according to claim 1, wherein said mitt-like cavity is coated with an impervious layer for preventing said mitt-like cavity from exposure of one or more said cleaning materials.

9. The disposable pad according to claim 1, wherein one or more said flaps comprises an identifier tab for identifying said cleaning material that will be exposed upon pulling one of said flaps to or from any pair of said first configuration and one or more said second configurations.

10. The disposable pad according to claim 9, wherein said identifier tab takes a form selected from the group consisting of text, color, and a graphic symbol.

11. The disposable pad according to claim 1, further comprising an air-tight disposable wrapper surrounding said disposable pad for reducing exposure of one or more said cleaning materials to surroundings prior to use, wherein said air-tight disposable wrapper is manufactured from a material selected from the group consisting of cellophane, aluminum foil and a material exhibiting at least partial polymeric composition.

12. The disposable pad according to claim 1, further comprising two transversely and oppositely directed rounded extensions for providing volume for a thumb for preventing said disposable pad from sliding off during use.

13. The disposable pad according to claim 1, further comprising perforations for detaching one or more said flaps from said disposable pad.

14. The disposable pad according to claim 13, wherein said perforations are oriented substantially parallel to and positioned proximate to said flap attachment line.

15. The disposable pad according to claim 13, wherein said perforations are oriented substantially parallel to and positioned proximate to said pad perimeter.

16. The disposable pad according to claim 1, wherein one or more said flaps further comprises an edge flap for maintaining position of said flaps, wherein said edge flap is positioned on one or more said flaps distal to said flap attachment line.

17. A disposable pad for cleaning surfaces, said disposable pad comprising:
 a first sheet having a first surface, a second surface, and a pad perimeter, wherein said first sheet is substantially planar;
 a second sheet operatively affixed to said second surface on at least two edges of said pad perimeter defining sheet attachment lines to form a mitt-like cavity for receiving a hand;
 a third sheet fastened to said first surface on a flap attachment line and at least two edges of said pad perimeter to form a cover layer;
 a fourth sheet fastened to said first surface on said flap attachment line to form two or more flaps;
 wherein one or more flaps are rotatably movable about said flap attachment line to and from a first configuration and one or more second configurations to expose a surface pair unique to said first configuration or each said second configuration, wherein each said surface pair comprises one or more cleaning materials; and
 said flap attachment line is oriented substantially parallel to a transverse centerline.

\* \* \* \* \*